UNITED STATES PATENT OFFICE.

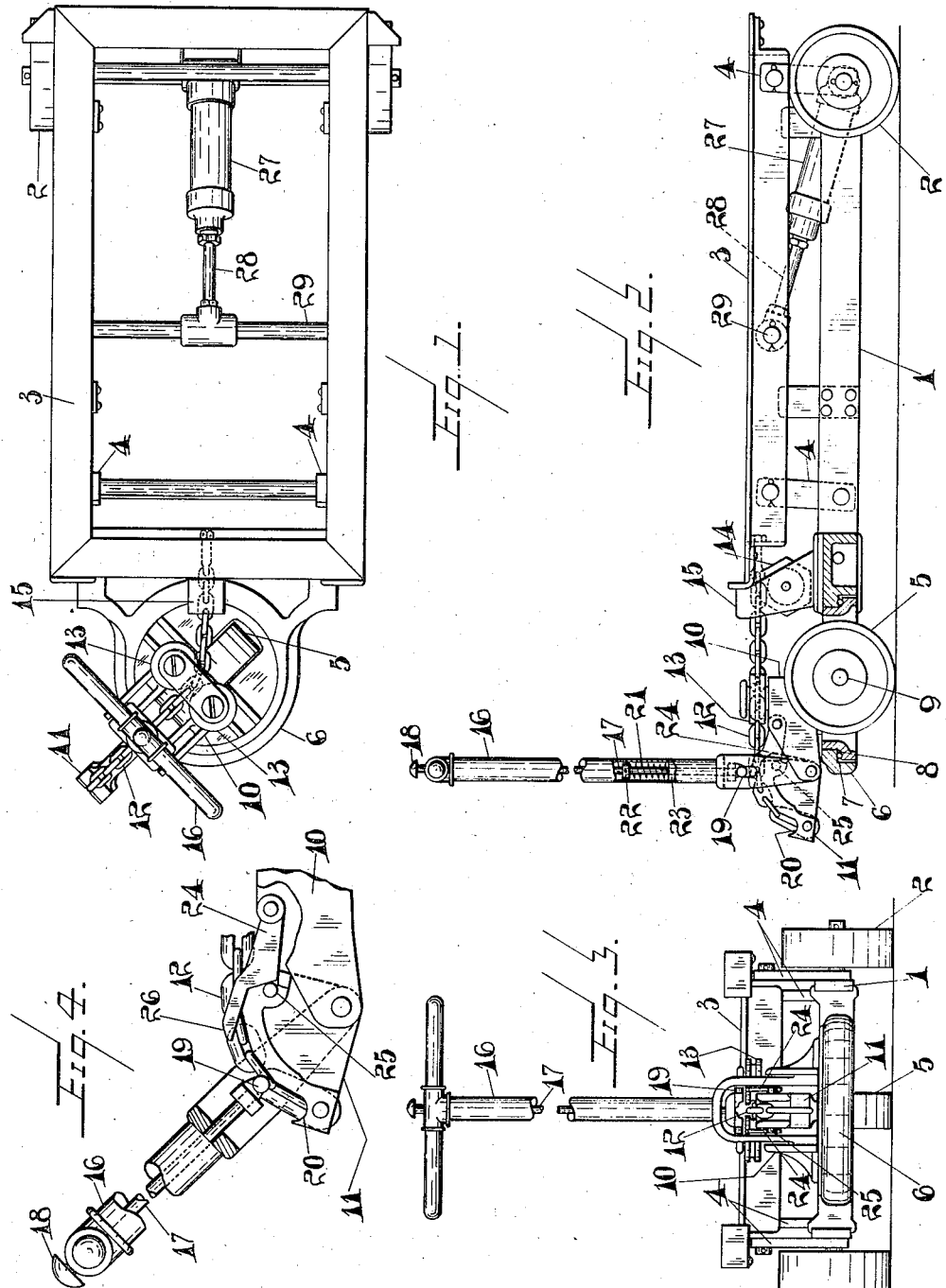

WILLIAM JAMES McCALLUM AND WARREN CHAMBERS, OF TORONTO, ONTARIO, CANADA, ASSIGNORS TO CHAPMAN DOUBLE BALL BEARING COMPANY OF CANADA, LIMITED, OF TORONTO, ONTARIO, CANADA.

ELEVATING-TRUCK.

1,149,457.  Specification of Letters Patent.  Patented Aug. 10, 1915.

Application filed August 11, 1914. Serial No. 856,248.

*To all whom it may concern:*

Be it known that we, WILLIAM J. MC-CALLUM and WARREN CHAMBERS, of the city of Toronto, county of York, Province of Ontario, Canada, have invented certain new and useful Improvements in Elevating-Trucks, of which the following is a specification.

This invention relates to trucks provided with vertically movable frames and used with raised platforms on which the goods to be moved are piled, the truck when the movable frame is lowered being adapted to pass under the platform and when the frame is raised to lift the platform from the ground, and our object is to devise a truck of this type which will be simple, strong and cheap to construct, and in which the elevation of the movable platform is effected by the depression of the handle of the truck, and particularly to construct the elevating mechanism that the platform may be raised with the handle, swung to one side or the other of a central vertical longitudinal plane intersecting the truck.

We attain our object by means of the constructions hereinafter specifically described and illustrated in the accompanying drawings in which—

Figure 1 is a plan view of our improved truck, Fig. 2 is a side elevation, Fig. 3 a front elevation, and Fig. 4 a detail in side elevation showing more particularly the means for engaging the handle with the lifting quadrant and for releasing the latch of the latter.

In the drawings like numerals of reference indicate corresponding parts in the different figures.

1 is the main frame of the truck which will be shaped to support the different parts and provided with suitable rear wheels 2. On this main frame is supported the movable frame 3, which movable frame is supported in any suitable manner so that it may be raised and lowered. Preferably we employ two pairs of links 4 pivoted on the main frame and on the movable frame. By moving the movable frame 3 endwise, it is also moved vertically.

The forward end of the main frame is provided with a suitable turntable carrying the wheel 5. This turntable is formed of the yoke 6 secured to the forward end of the frame 1. This yoke has formed therein one part 7 of an annular ball race. The other part of the ball race is formed in what we term the housing 8. To this housing is secured the axle 9 of the steering wheel 5. The wheel is preferably journaled on the axle by means of ball bearings.

Secured to the housing 8 is the upwardly extending bracket 10. On the forward part of this bracket is journaled the quadrant 11. Over this quadrant passes the chain 12, one end of the chain being secured to the forward part of the quadrant. The periphery of the quadrant, it will noted, is suitably shaped for engagement by the links of the chain. This chain extends rearwardly and is secured to the forward end of the movable frame 3. Journaled on the bracket 10 are a pair of sheaves or guide pulleys 13. These are journaled side by side with the rearward portion of the gap between them substantially in a vertical line above the center of the axle 9. The chain 12 passes between these guide pulleys and over a roller 14 journaled on the bracket 15 secured to the main frame. This roller, it will be seen, is polygonal in shape so that the flat links of the chain contact with its flat sides. Its periphery is also grooved to receive the links of the chain which lie edgewise relative to the roller.

It is evident that by suitably rocking the quadrant 11 that the chain 12 will be drawn upon to effect an endwise movement of the movable frame, which results in its being simultaneously moved vertically. It further results that if the turntable be turned to direct the quadrant toward either side, that the chain will be just as effectively drawn up by rocking the quadrant, owing to the manner in which the chain is guided by the sheaves 13, (see particularly Fig. 1).

The main function of the roller 14 is to keep the chain in substantial alinement with the grooves in the sheaves 13 whether the movable frame 3 be up or down. To effect the movement of the quadrant 11, we utilize the handle 16 which also serves as a means by which the truck may be drawn about. This handle is yoke-shaped at its lower end and is fulcrumed concentric with the quadrant 11. This handle is provided with any suitable means by which it may be given an operating engagement with the quadrant 11.

Preferably we provide a rod 17 sleeved within the handle and projecting through the handle at its upper end where it is provided with a button 18. The lower end of this rod has a transverse pin or bolt 19 formed thereon. This bolt is preferably cut away centrally, as shown particularly in Fig. 3, to enable it to straddle the chain 12. When the rod 17 is pressed down this bolt 19 is brought into position to engage with the shoulders 20 formed at the outer end of the quadrant 11. Normally the rod is held up to hold the bolt 19 out of the path of the shoulders 20 by means of the coil spring 21, which engages a collar 22 secured to the rod and a shoulder 23 formed in the handle.

The movable platform is elevated by pressing down the rod 17 until the bolt 19 comes in the plane of the shoulders 20, then by drawing down the handle, the quadrant may be moved to the position shown in Fig. 2 when the movable frame is raised. To hold the parts in this position we provide a double latch 24 pivoted on the bracket 10 and adapted to engage behind the ends of the pins 25 on the quadrant 11 when the quadrant is in the position shown in Fig. 2. Means are provided for raising these latches when the movable frame is to be dropped. We preferably use the bolt 19 for this purpose, the latches 24 being provided with tails 26, beneath which the bolt 19 may engage when pressed down to the position shown in Fig. 4. The tails being inclined, the rearward movement of the bolt lifts the latches from behind the pins 25. To ease the downward movement of the movable frame when a load is upon it, we provide a dash pot which may be of any ordinary cylinder type, the cylinder 27 being pivoted to the rear axle and the piston rod 28 being pivotally connected with the cross bar 29 of the movable frame.

The operation of the device is as follows, assuming the platform to be in its lowered position: The truck with its frame lowered is pushed under the elevated platform on which the load to be moved is usually supported. The button 18 is then pressed down, causing the bolt 19 to move into the path of the shoulder 20. By forcing the handle down toward the floor level, the quadrant 11 is rocked until the latches 24 engage behind the pins 25. The platform is then raised from the ground and the truck may be drawn anywhere in the usual way by means of the handle, the turntable swinging as may be necessary in the steering. When the load is to be deposited, the button 18 is again depressed to bring the bolt 19 into the path of the tails 26 of the latches 24. By pushing the handle up to the vertical, the latches are released and the platform is allowed to fall, its fall being controlled by the dash pot.

It is evident that the load may be elevated or deposited with the handle turned at any angle to the central longitudinal vertical plane of the truck, so that the truck may be used in much narrower alleyways than if the elevation could only take place with the handle substantially in the central longitudinal vertical plane of the truck.

The whole construction of the truck, it will be seen, is very simple and amply strong. As ball bearings are provided wherever rolling friction occurs, a very easily propelled truck is obtained.

What we claim as our invention is:

1. In an elevating truck the combination of the main frame; a frame mounted on said main frame so as to move vertically when moved horizontally; a turntable mounted on said main frame to rotate horizontally; a rocking member mounted on said turntable to swing in a vertical plane; a flexible connection between said rocking member and the movable frame; guide means adapted to maintain the pull of said flexible connection on the movable frame in substantially the same direction for any position of the turntable; comprising a pair of horizontal grooved guides supported on the turntable close to one another, the flexible connection passing between them; a handle fulcrumed in operative relationship to the rocking member; and means for operatively connecting the handle and the rocking member at will.

2. In an elevating truck the combination of the main frame; a frame mounted on said main frame so as to move vertically when moved horizontally; a turntable mounted on said main frame to rotate horizontally; a rocking member mounted on said turntable to swing in a vertical plane; a flexible connection between said rocking member and the movable frame; guide means adapted to maintain the pull of said flexible connection on the movable frame in substantially the same direction for any position of the turntable; a handle fulcrumed in operative relationship to the rocking member; means for operatively connecting the handle and the rocking member at will; and a latch pivoted on the turntable adapted to lock the rocking member when the movable frame is in its elevated position, the means for operatively connecting the handle and the rocking member being adapted also to be positioned to engage and release said latch when the handle is moved toward the vertical.

3. In an elevating truck employing a frame vertically movable on the truck frame; means for actuating the movable frame comprising a turntable; a quadrant pivoted on the turntable; a chain secured to the vertically movable frame and to the said quadrant so as to wrap on the same; a pair of horizontal guide sheaves pivotally supported on the turntable close to one another, the chain leading between them; a handle fulcrumed concentric with the quadrant; and means for locking the handle to the quadrant at will.

4. In an elevating truck employing a frame vertically movable on the truck frame; means for actuating the movable frame comprising a turntable; a quadrant pivoted on the turntable; a chain secured to the vertically movable frame and to the said quadrant so as to wrap on the same; a pair of horizontal guide sheaves pivotally supported on the turntable close to one another, the chain leading between them; a handle fulcrumed concentric with the quadrant; and means for locking the handle to the quadrant at will comprising a rod slidable longitudinally of the handle, and a bolt carried by said rod, the quadrant being provided with a shoulder engageable by the bolt.

5. In an elevating truck employing a frame vertically movable on the truck frame; means for actuating the movable frame comprising a turntable; a quadrant pivoted on the turntable; a chain secured to the vertically movable frame and to the said quadrant so as to wrap on the same; a pair of horizontal guide sheaves pivotally supported on the turntable close to one another, the chain leading between them; a handle fulcrumed concentric with the quadrant; means for locking the handle to the quadrant at will; and a vertical roller journaled on the main frame behind the pair of rollers, the chain passing over it.

6. In an elevating truck employing a frame vertically movable on the truck frame; means for actuating the movable frame comprising a turntable; a quadrant pivoted on the turntable; a chain secured to the vertically movable frame and to the said quadrant so as to wrap on the same; a pair of horizontal guide sheaves pivotally supported on the turntable close to one another, the chain leading between them, a handle fulcrumed concentric with the quadrant; means for locking the handle to the quadrant at will; a latch pivoted on the turntable; and a projection on the quadrant with which said latch may engage when the quadrant has been rocked forward.

7. In an elevating truck employing a frame vertically movable on the truck frame; means for actuating the movable frame comprising a turntable; a quadrant pivoted on the turntable; a chain secured to the vertically movable frame and to the said quadrant so as to wrap on the same; a pair of horizontal guide sheaves pivotally supported on the turntable close to one another, the chain leading between them; a handle fulcrumed concentric with the quadrant; means for locking the handle to the quadrant at will comprising a rod slidable longitudinally of the handle, and a bolt carried by said rod, the quadrant being provided with a shoulder engageable by the bolt; a latch pivoted on the turntable; a projection on the quadrant with which said latch may engage when the quadrant has been rocked forward; and a tail on said latch, the aforesaid bolt when in its shoulder engaging position being adapted when the handle is moved up to engage said tail to release the latch.

Toronto this 31st day of July A. D. 1914.
   WILLIAM JAMES McCALLUM.
   WARREN CHAMBERS.
In the presence of—
   J. EDW. MAYBEE,
   D. S. TOVELL,
   H. M. CHRISTMAN.